United States Patent

[11] 3,550,678

| [72] | Inventor | Robert R. Pfouts |
| | | Dayton, Ohio |
| [21] | Appl. No. | 811,944 |
| [22] | Filed | Apr. 1, 1969 |
| [45] | Patented | Dec. 29, 1970 |
| [73] | Assignee | United Aircraft Products, Inc. |
| | | Dayton, Ohio |
| | | a corporation of Ohio |

[54] SURFACE RADIATOR
12 Claims, 5 Drawing Figs.

[52] U.S. Cl. ............................................. 165/44, 164/165
[51] Int. Cl. .................................................. F28f 3/00
[50] Field of Search .................................... 165/44, 153, 154, 165, 166

[56] References Cited
UNITED STATES PATENTS

| 2,222,721 | 11/1940 | Ramsaur et al. | 165/165X |
| 2,469,028 | 5/1949 | Belaieff | 165/153 |
| 2,782,008 | 2/1957 | Caughill | 165/166X |

Primary Examiner—Robert A. O'Leary
Assistant Examiner—Theophil W. Streule
Attorney—J. E. Beringer ABSTRACT: A surface radiator-locating passage means for a heated fluid in an intermediate relation to a surface plate on one side thereof and to other passage means for the confined flow of a coolant on the other side thereof. Normally cooled by air currents blowing over the surface plate, the heated fluid may in the alternative be cooled by coolant flow through the described other passage means, as for example in the absence of blowing air currents.

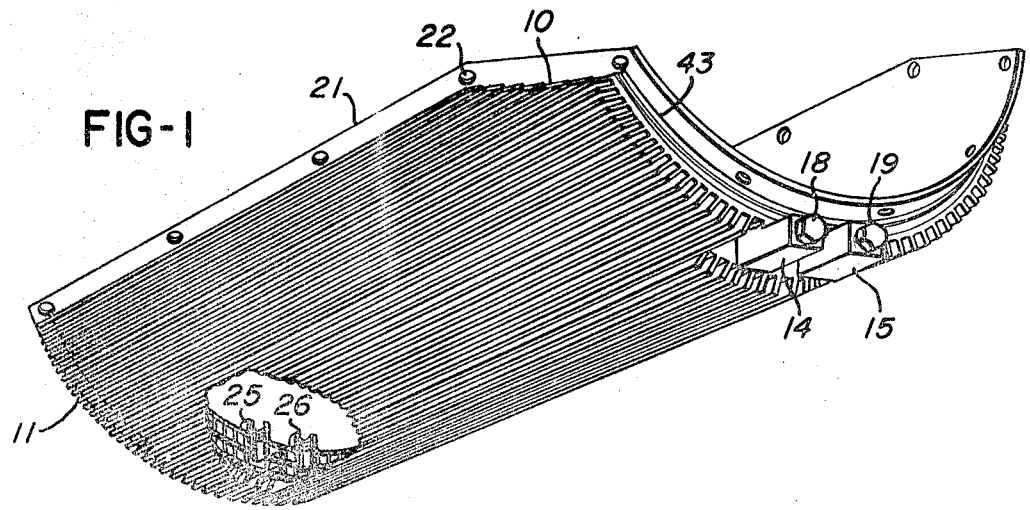
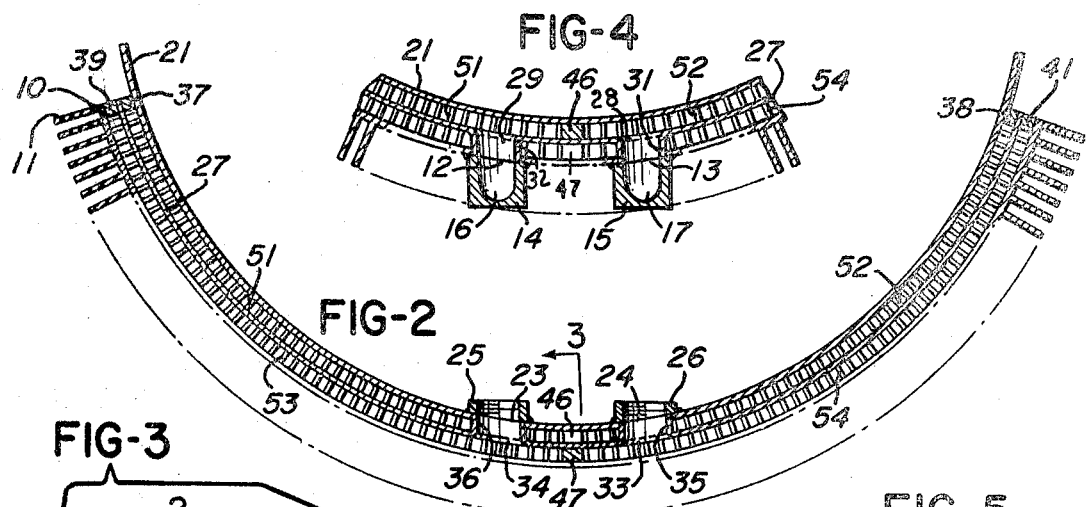
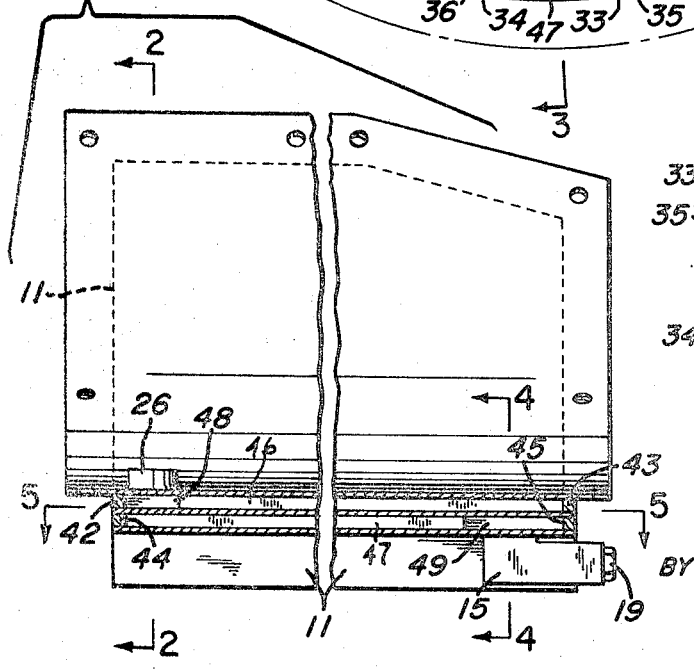
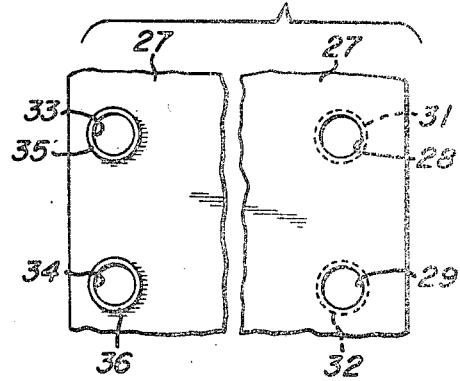
INVENTOR
ROBERT R. PFOUTS
HIS ATTORNEY

SURFACE RADIATOR

This invention relates to surface radiators, and particularly to surface radiators having a supplemental or alternative means of effecting heat transfer.

Surface radiators are known as plate-like devices in which a plate is exposed on one side surface to flow of a relatively free first fluid thereover while a confined second fluid is circulated over an opposite plate surface. A common installation may find the plate presented for flow of a cooling air current over the first-mentioned surface in a manner to exert a cooling effect upon the circulating second fluid. Heat conducted through the plate wall is rejected to flowing air currents. Although not so limited, surface radiators have particular utility in aircraft in which air currents resulting from flight of the aircraft or from engine operation are utilized as the flowing coolant. Surface radiators lend themselves particularly well to such installations since they may be relatively simply constructed and may assume a variety of configurations to conform to existing mount requirements. They may, for example, be embodied in duct walls as an integral part thereof. A disadvantage of surface radiators has been, however, that their ability to cool is greatly reduced or lost when the outside current of cooling air ceases, as for example, when an aircraft is on the ground with its engines shut off. If the heat rejection requirements are at the same time correspondingly reduced or eliminated no problem occurs. However, in the presence of continuing heat rejection requirements the advantages of a surface radiator cannot be realized and recourse must instead be had to other forms of heat transfer device.

The instant invention has in view a surface radiator which may function normally to transfer heat to a flowing air current when such air flow is available and which has an alternate operational phase in which continued cooling may be effected despite the absence of external or ambient air flow. In carrying out the inventive concept a passageway for a confined fluid is located in flanking relation to the passage circulating the heated fluid and appropriate means are provided by which a coolant may selectively be directed to and through such flanking passageway.

An object of the invention is to construct a surface radiator equipped for supplemental or alternative cooling as described in a manner to maintain advantages of simplicity and adaptability characteristic of surface radiators of the prior art.

Another object of the invention is to obviate leakage between internal passageways for different confined fluids by an arrangement of ported passages uniquely utilizing an intermediate tube sheet.

A further object of the invention is to enable and to facilitate the making of connections to the radiator for supply of a supplemental coolant, it being contemplated in this connection that such connections should be made from the exterior of the radiator quickly and conveniently and without change in its installed condition.

Other objects and structural details of the invention will appear from the following description, when read in connection with the accompanying drawings, wherein:

FIG. 1 is a view in perspective of a surface radiator in accordance with the illustrated embodiment of the invention, a portion being broken away to show inlet and outlet connections for a heated fluid;

FIG. 2 is a view in cross section, taken substantially along the line 2-2 of FIG. 3;

FIG. 3 is a view in longitudinal section, taken substantially along the line 3-3 of FIG. 2;

FIG. 4 is a fragmentary view in cross section, taken substantially along the line 4-4 of FIG. 3; and FIG. 5 is a fragmentary plan view taken substantially along the line 5-5 of FIG. 3.

Referring to the drawings, a surface radiator in accordance with the illustrated embodiment of the invention comprises a plate 10 made of a heat conductive material. From one side surface of the plate 10 extend fins 11 which lend strength to the plate and provide extended heat transfer surface. The fins 11 are in the illustrated instance unitary parts of the plate 10 being formed integrally therewith, as by a milling process. Near one end of the plate 10 is a pair of spaced apertures 12 and 13 (FIG. 4). In the portion of the plate occupied by apertures 12 and 13, the fins 11 are interrupted. In the interrupted space are fittings 14 and 15 having angled internal passages 16 and 17 which communicate respectively with the apertures 12 and 13. The passages 16 and 17 open longitudinally through the respective fittings and are internally screw threaded. Closure caps 18 and 19 are normally installed in the threaded ends of passages 16 and 17 to close the fittings 14 and 15.

In a parallel spaced relation to plate 10 is another plate 21 acting as a coresheet. Marginal edges of the coresheet 21 are in projecting relation to the plate 10 and have bolt holes 22 formed therein facilitating mounting of the radiator device. Adjacent one end of the coresheet 21 is a laterally spaced pair of apertures 23 and 24. Internally threaded bosses 25 and 26 seat on the coresheet in an aligned relation to respective apertures 23 and 24. The plate 10 and coresheet 21 occupy an inverse relation in respect of one another and with reference to the location of apertures 12—13 and 23—24 therein. The arrangement thus places apertures 12 and 13 with their fittings 14 and 15 at one end of the radiator device and the apertures 23 and 24 with their bosses 25 and 26 at the other end of the device.

Disposed in an intermediate, parallel relation to the plate 10 and the coresheet 21 is a heat conductive tubesheet 27. Near one end of the tubesheet 27 is a pair of laterally spaced-apart openings 28 and 29. By an extrusion or like process margins of these openings are deformed out of the plane of the tubesheet and define respective tubular connectors 31 and 32. Near the other end of the tubesheet 27 is a like pair of openings 33 and 34 surrounded by integrally formed projecting tubular connectors 35 and 36. The pairs of openings 28—29 and 33—34 are symmetrically arranged relatively to one another and are identical except that the margins thereof are deformed in opposite directions. Thus, in looking downward upon the tubesheet, as in FIG. 5, the integrally formed connectors 31 and 32 surrounding openings 28 and 29 extend downward from the tubesheet. Connectors 35 and 36, however, surrounding apertures 33 and 34 project upwardly.

The tubesheet 27 is held in an intermediate spaced relation between the plate 10 and coresheet 21 by marginal spacer strips. These include side strip pieces 37 and 38 between the coresheet and tubesheet, and side strip pieces 39 and 41 between the tubesheet and plate 10. Similarly, end pieces 42 and 43 are between the coresheet and tubesheet and end pieces 44 and 45 are between the tubesheet and the plate. Still further comprised in the assembly of spacer strips is a centrally positioned pair of strips 46 and 47. These extend lengthwise of the device respectively between the coresheet and the tubesheet and between the tubesheet and the plate. In length they are shorter than the length of the tubesheet. Each thereof, therefore, at one end is in abutting contacting relation to an end spacer piece but falls short of abutting contact with its companion end piece. The central spacer pieces 46 and 47 are, moreover, relatively inversely arranged. The arrangement is one to divide the space between coresheet 21 and tubesheet 27 into chambers or subspaces on opposite sides of the spacer piece 46, with communication between such chambers permitted around the free end of the spacer piece or through a passage 48 as defined thereby. Similarly, the space between plate 10 and tubesheet 27 is divided by spacer piece 47 into subspaces communicating with one another through a passage 49, the passages 48 and 49 being at respectively opposite ends of the radiator device. Within the chamber defined by coresheet 21 and tubesheet 27, on one side of the centrally disposed spacer strip 46 is a strip 51 of corrugated fin material. In the corresponding chamber on the other side of centrally disposed spacer 46 is a strip 52 of corrugated fin material. Similar fin strips 53 and 54 are disposed on opposite sides of central spacer strip 47 between plate 10 and tubesheet 27. Appropriate openings in the several fin strips 51—54 provide for passage of the tubular connectors 31—32 and 35—36 therethrough.

A surface radiator as disclosed is given a unitary, one-piece character by suitable metallurgical bonding techniques. The parts, exclusive of fittings 14—15 and bosses 25 and 26 are stacked or otherwise assembled in the illustrated relationship. Brought together in a suitable fixture, the parts may be tack welded together as a preliminary mode of connection, following which the assembly is subjected to brazing as in a furnace or by dipping in a molten flux to achieve a permanent joining together of the parts. In a final assembly step, the fittings 14—15 and bosses 25—26 are welded in place.

The surface radiator has in the illustrated instance an arcuate configuration. Preforming of individual parts to the curved shape allows the radiator to be assembled in the final configuration it is to assume and obviates the stressing of brazed connections that may be involved in forming operations subsequent to assembly. In its arcuate shape, the radiator conforms to a segment of a cylinder and is adapted for installation in a cylindrical air duct or in a conforming, wrap around relation to a mounting surface, as for example a pod dependent from an air frame. The radiator may, of course, assume configurations other than that shown including one in which it is to a greater or lesser extent cylindrical and one in which the concavo-convex relationship of the coresheet 21 and of plate 10 is reversed.

In use of the radiator, it is installed in a manner to have its plate 10 and projecting fins 11 function as a surface plate. Thus, it is suitably mounted in relation to relatively flowing air currents to bring the plate 10 under the temperature influence of such currents, the fins 11 playing an extended surface function in bringing about a more rapid rate of heat transfer. The bosses 25 and 26 are adapted to be connected in a system circulating a first confined fluid. Such fluid, entering the device by way of boss 25, for example, flows through connector 36 to the chamber between plate 10 and tubesheet 27, on one side of center spacer strip 47. Within such chamber, the fluid flows longitudinally of the radiator to the opposite end where it passes through passage 49 and retraces its movement on the other side of strip 47 back to opening 33 and connector 35, discharging by way of boss 26. In the process, the fluid flows in contacting relation to plate 10, with an appropriate transfer of heat taking plate through the plate between the circulating confined fluid and the external air currents flowing over the fins 11. The fittings 14 and 15 are adapted to be connected for circulation of another fluid. This other fluid enters the device, as by way of fitting 14, and flows through connector 32 to the chamber between coresheet 21 and tubesheet 27. Flowing longitudinally of the radiator in such chamber, the said other fluid passes through end passage 48 and reverses its flow on the other side of spacer strip 46 back to opening 28, connector 31 and fitting 15. The strip fin members 51—54 provide extended surface for more effective heat transfer in respect of the confined fluids, and have a structural function in limiting the possibility of deforming of the tubesheet 27 and coresheet 21 under internal pressures.

In accordance with one use to which the radiator device is adapted, the bosses 25 and 26 provide for the inlet and outlet of a transfer fluid circulated to and from a source of heat, as for example electronic equipment, in order to limit maximum temperatures at such source. The circulating fluid absorbs heat at the source, is directed to the surface radiator where it is caused to yield up a portion of its heat to the air flowing over fins 11 and is returned to the heat source in a cooler condition. The flowing air currents passing over plate 10 thus become the ultimate heat sink and their presence is required for heat transfer through the plate 10 at contemplated design rates. The interior chambers communicating with fittings 14 and 15 become, under this concept of operation, connections of selective use. Normally closed by caps 18 and 19, these fittings may be connected to a source of circulating liquid coolant when air flow over the plate 10 is unavailable or ceases. Advantage is taken thereby of the fact that the heated fluid flowing between plate 10 and tubesheet 27 may as effectively reject its heat through tubesheet 27 as through the plate 10. Thus, a liquid coolant entering the device by way of fitting 14 flows through the spaces between coresheet 21 and tubesheet 27 to outlet fitting 17 and in the process cools the heated fluid by conducting heat through the tubesheet, absorbing heat from the circulating transfer fluid. In an aircraft installation to which the surface radiator is adapted, the assembly is mounted in a conforming relation to an underslung pod containing electronic equipment. Connections are made at bosses 25 and 26 to an internal system circulating a transfer fluid. The fittings 14 and 15 are closed by caps 18 and 19. Under flight conditions sufficient air flows over the fins 11 and the exterior of plate 10 to conduct heat from the transfer fluid at a rate predetermined to meet design specifications. When the aircraft is on the ground, however, rejection to ambient surroundings, without the presence of flowing air currents, may be inadequate to dispose of generated heat, when the electronic equipment continues in operation. Under these conditions, the secondary cooling system provided by the present radiator is brought into use. Closure caps 18 and 19 are removed and connections to fittings 14 and 15 made from a ground supply system. deionized water or like liquid coolant is supplied from such system to fitting 14 and flows through the radiator device with a cooling effect upon the heated transfer fluid as described. Water leaving the device by way of fitting 15 may be discharged to waste or returned for cooling and reuse. When no longer needed, the ground supply system is disconnected and the fittings 14 and 15 reclosed.

According to a feature of the invention, the fittings 14 and 15 are presented externally of the radiator device for greater accessibility by the ground supply system. The crossover connections defined by tubular connectors 31—32 and 35—36 connect the inlet and outlet port means for the respective fluids to their relatively remote confined passageways in the radiator device. According to a further feature of the invention, these connectors are formed integrally with the tubesheet and brazed or welded at their ends into plate 10 and coresheet 21 respectively. The arrangement is one of appreciable simplicity and one achieving positive separation of the confined fluids.

Other features and advantages of the invention will be self-evident from the preceding description, read in connection with the accompanying drawings and it will be further evident that modifications in the illustrative embodiment of the invention are possible without departing from the disclosed inventive concept. Also, uses of the invention other than that disclosed are evidently possible. The radiator device may be used for heating as well as cooling. The so-called transfer fluid passed between plate 10 and tubesheet 27 may be any fluid in need of heating or cooling, including lubricating and hydraulic oils. The invention has been disclosed as having particular application to an embodiment in which flow of a temperature modifying fluid in the space between coresheet 21 and tubesheet 27 occurs in lieu of or in the absence of heat transfer through the plate 10. It is of course also within the intent of the invention that permanent system connections might be made to the fittings 14 and 15 for continuous heat transfer through the tubesheet 27 supplemental to heat exchange through plate 10. The heat transfer capabilities of the radiator device could in this manner be substantially increased without a corresponding increase in the required surface area presented by plate 10 and fins 11.

In the illustrated instance, the coresheet 21 has been shown as relatively projected so that its margins may serve as the means by which the radiator device is mounted to a supporting body. In lieu of this construction margins of the plate 10 might be projected for that purpose, leaving the coresheet to be substantially coextensive with tubesheet 27. In general, the requirements of an installation will determine the manner of mounting of the radiator device.

I claim:

1. A surface radiator equipped with added means of heat transfer, including a surface plate having means mounted to one side thereof to circulate a heated fluid in contact with said one side with conducted heat being rejected to ambient surroundings on the other side thereof, relatively projecting extended surface means on said other side of said surface plate, said mounted means including a heat transfer wall in spaced relation to said plate and defining therewith a flow passage for said heated fluid, and other passage means having said heat transfer wall in common with said heated fluid flow passage for circulating a liquid coolant to absorb the conducted heat of said heated fluid in a supplemental or alternative relation to the transfer of heat through said surface plate, said surface plate, said mounted means and said passage means being joined in an integral device positionable as a unit for a flow of air over the said other side of said surface plate and affording aperture ports by which the heated fluid and the liquid coolant may individually be circulated to and from the device.

2. A surface radiator according to claim 1, characterized in that the said other side of said surface plate is formed with ribs for increased surface contact with flowing ambient air, said ribs projecting normally of the plate and defining said relatively projected extended surface means.

3. A surface radiator according to claim 1, characterized in that said aperture ports include normally closed port means extending from said heat transfer wall to and through said surface plate to open on the said other side of said plate for selective connection to a source of liquid coolant.

4. A surface radiator according to claim 3, characterized in that said aperture ports further include port means extending in the opposite direction from said heat transfer wall through said device for connection in a system circulating the heated fluid.

5. A surface radiator according to claim 1, wherein said heat transfer wall has the character of a tubesheet and said other passage means includes a coresheet in spaced relation to said tubesheet, said tubesheet being intermediately disposed between said surface plate and said coresheet and defining flow passages on opposite sides thereof, marginal spacers closing sides of said flow passages and connecting said surface plate, said tubesheet and said coresheet into a unitary assembly.

6. A surface radiator according to claim 5, characterized in that said aperture ports include normally closed port means opening through said other side of said surface plate and cross over connection means extending through said heated fluid flow passage to and through said heat transfer wall to communicate with said liquid coolant-circulating flow passage.

7. A surface radiator according to claim 5, characterized in that said aperture ports include port means opening through said coresheet and crossover connection means extending from said port means through said liquid circulating passage to and through said tubesheet to communicate with said circulating heated fluid flow passage.

8. A surface radiator according to claim 1, characterized in that said other passage means includes a coresheet, said heat transfer wall having the character of a tubesheet and being intermediately disposed between said surface plate and said coresheet and defining flow passages on opposite sides thereof, the heated fluid flowing between said surface plate and said tubesheet and said liquid coolant flowing between said coresheet and said tubesheet, said tubesheet having apertures therein to align with said aperture ports, and crossover connections being provided to communicate said apertures with said aperture ports, said aperture ports being formed in said surface plate and in said coresheet.

9. A surface radiator according to claim 8, characterized in that said crossover connections are extrusions formed integrally with said tubesheet and extending transversely through respective flow passages to be joined in a sealing relation to the surface plate and coresheet in a manner to preclude communication with traverse flow passages.

10. A surface radiator, including a plate having a configuration to expose an extended surface on one side thereof to contact with a flowing air current, means mounted to the opposite side of said plate forming a confined passage for flow of a fluid over the surface of said plate on said opposite side, said fluid having a temperature different from the temperature of said flowing air, an exchange of heat taking place through said plate between said fluid and said flowing air current, said mounted means including a heat conductive tubesheet spaced from said opposite side of said plate and contacted by fluid flowing through said confined passage simultaneously with contact of said plate by said fluid, and means forming another confined passage for selective flow of another fluid in contact with said tubesheet in separated relation to the first said fluid, said other fluid having a temperature different from the temperature of the first said fluid, heat transfer through said tubesheet occurring with flow of said other fluid and being utilized in the absence of a flowing air current to achieve a modification in temperature of the first said fluid.

11. A surface radiator according to claim 10, characterized by aperture port means accessible from the said one side of said surface plate to connect said other confined passage to a source of said other fluid, said radiator including a crossover connection extending through the first said confined passage and through said tubesheet to communicate said port means with said other confined passage.

12. A surface radiator according to claim 10, characterized by a coresheet spaced from said tubesheet and forming therewith said other confined passage, said coresheet having port means therein connected in a system circulating the first said fluid, said radiator including a crossover connection extending through the said other passage and through said tubesheet to communicate said other port means with the first said confined passage.